March 22, 1966  D. I. SMITH  3,242,379

RECTIFIER COOLING ARRANGEMENT

Filed Oct. 19, 1961

*INVENTOR.*
DAVID I. SMITH

BY *Robert H. Montgomery*

ATTORNEY

United States Patent Office 3,242,379
Patented Mar. 22, 1966

3,242,379
RECTIFIER COOLING ARRANGEMENT
David I. Smith, Lawrence Park, Erie, Pa., assignor to General Electric Company, a corporation of New York
Filed Oct. 19, 1961, Ser. No. 146,112
8 Claims. (Cl. 315—113)

This invention relates to liquid cooling of metal shell rectifier tubes, and more particularly relates to cooling of such tubes in a full-wave rectifier arrangement.

In high power alternating-to-direct current conversion systems, it is quite common to utilize rectifiers of the liquid cathode type, such as ignitrons. These rectifier tubes are enclosed in a metal envelope which defines a reservoir for the cathode liquid. It is usually necessary to provide a flow of cooling liquid over or about the envelopes to remove the large quantities of heat generated therein upon operation of the tube. Inasmuch as the cooling liquid contacts the envelope or shell which is at cathode potential, the cooling liquid assumes the potential of the cathode.

When individual inlet and outlet insulating hoses are connected to coolant jackets about the shells from grounded coolant manifolds, as is customary in rectifier systems, there is a continuous flow of leakage current to ground through the coolant from the tubes. The flow of current through the cooling liquid presents problems such as corrosion of piping and hose fittings through electrolysis and galvanic action. Moreover, if the electrical circuit contains equipment that must be insulated from ground, then such ground leakage current must be evaluated. Leakage current has been combatted in the past by using distilled water as the coolant to increase resistance to leakage current. Also, insulating hose length has been increased to increase the length and therefore the resistance of the leakage current path to limit the leakage current to less than some predetermined value, so that it does not detract from the sensitivity of ground fault detection equipment. This results in many hoses that may be many times longer than is necessary to connect points a small distance apart.

Accordingly, it is an object of this invention to provide an improved liquid cooling system for a metal shell full-wave rectifier system in which leakage currents do not affect ground protection equipment.

It is a further object of this invention to provide an improved cooling system for a full-wave rectifier system which uses a minimum number of connections and minimizes length of connecting hoses.

Briefly stated, the invention in one form thereof comprises the provision of a metal shell type rectifier cooling system wherein there is no unbalance in leakage currents flowing to and from ground. The invention provides for the use of only two insulating coolant conduits connected to the coolant supply which is at ground potential, and the coolant-conducting piping is so arranged that the two insulating conduits that connect to ground carry coolant leakage current which reverses in direction on each half cycle of applied alternating current. By selecting the two hoses to be of equal ratio of length to area, the ground potential portion of the coolant is held midway between the positive and negative potential peaks, and no leakage current which would detract from the sensitivity of a ground-detecting relay is circulated due to leakage current in the coolant.

The novel features of the invention are pointed out with particularity in the claims appended to and forming part of this specification. However, the invention may best be understood by reference to the following description taken in conjunction with the drawings wherein:

Figure 2:
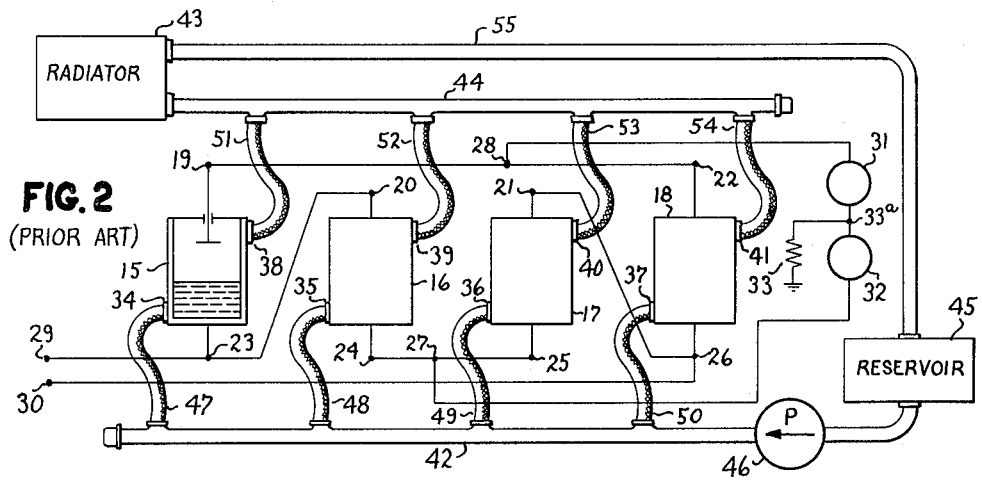
FIGURE 2 illustrates a prior art bridge rectifier cooling system.
Figure 1:
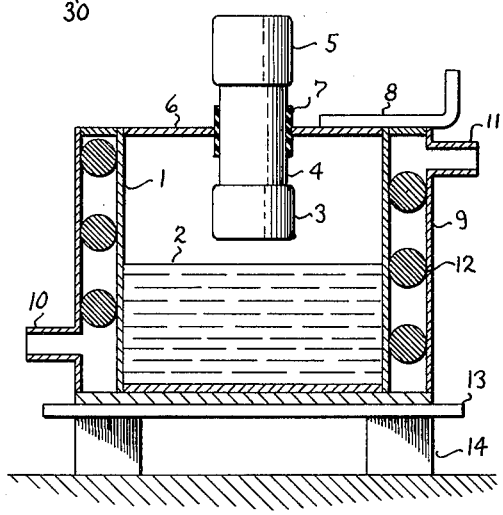
FIGURE 1 illustrates in section, a typical metal shell rectifier.

Reference is now made to FIGS. 1 and 2, which for purposes of background and orientation, illustrate a prior art metal shell rectifier cooling arrangement and in part a section of a typical liquid cathode type rectifier tube.

The liquid cathode rectifier tube of FIG. 1 comprises a metallic envelope 1 which contains a liquid cathode 2, usually mercury. An anode electrode 3 is carried by a conductive support lead 4 which connects to an anode electrode terminal 5. The electrode support lead 4 is electrically insulated from the top cover 6 of envelope 1 by an insulating bushing 7. A cathode electrode terminal 8 is mounted on envelope top plate 6. Flow of current through the tube of FIG. 1 is accompanied by a voltage drop, called the arc drop, which causes a power loss appearing as heat. To remove the heat generated in the tube, a jacket 9 for liquid coolant, usually water, is provided about envelope 1, which has a coolant inlet 10 adapted to receive a coolant conduit and a coolant discharge port 11 adapted to be connected to a coolant conduit. To optimize the cooling effect of the coolant, a length of round stock, such as stainless steel 12, may be helically wound about the exterior periphery of envelope 1 and welded thereto to define with envelope 1 and jacket 9 a helical channel about envelope 1 from inlet port 10 to discharge port 11. The tube assembly is mounted on a platform 13 which in turn is supported on insulating blocks 14 above a base which is at ground potential.

It will be noted that by virtue of the construction of the tube the envelope 1 and jacket 9, and also any coolant therebetween, will assume the electric potential or essentially the potential of the cathode. Therefore, it is readily apparent that the tube must be insulated from ground.

As will be recognized by one skilled in the art, a tube of the type shown in FIG. 1 also includes a starter or igniter electrode to control the firing thereof, and other structural features which are not illustrated. Hereinafter, where speaking of a liquid pool cathode tube of the type shown in FIG. 1, the envelope and other tube structure which is electrically at the same potential as the envelope will be termed the tube "shell."

The rectifier cooling system of FIG. 2, which is an example of the prior art, comprises rectifying means in each leg of a full-wave rectifier system. In the illustration, each leg contains a metal shell liquid-cooled cathode type rectifier 15, 16, 17 and 18, which may be of the type illustrated in FIG. 1. For clarity of illustration, tube 15 in FIG. 2 is shown in section. In view of the illustration of FIG. 1 and discussion thereof, no further description of the structure of tubes 15–18 is made. Rectifier tubes 15, 16, 17 and 18 have anode electrode terminals 19, 20, 21 and 22, and cathode electrode terminals 23, 24, 25 and 26 respectively. The cathode terminals 24 and 25 of tubes 16 and 17 are electrically commonly connected at point 27. The anode terminals 19 and 22 of tubes 15 and 18 are electrically commonly connected at point 28. Anode terminal 20 is electrically connected to cathode terminal 23 and anode terminal 21 is connected to cathode terminal 26 to thus provide the familiar full-wave bridge rectifier circuit. It is to be understood that each leg of the rectifier bridge may comprise a plurality of rectifier tubes in parallel and in practice, this is often the case. Alternating current (A.C.) power is applied across the rectifier bridge at input terminals 29 and 30 from an A.C. source, not shown, and rectified direct current (D.C.) is derived at positive terminal point 27 and negative terminal point 28. A load, which may be series-connected traction motors 31 and 32, is connected across points 27 and 28.

Inasmuch as the rectifier tubes are all insulated from ground, to protect system equipment it becomes necessary to sense any ground fault in the system. Relay coil 33 is connected between point 33a and ground to sense any ground fault. The relay coil 33 may be arranged to cause interruption of the A.C. power supplied to terminals 29 and 30 by means of a circuit breaker, not shown, upon detection of a ground fault.

Each of the tubes 15, 16, 17 and 18 has a coolant inlet 34, 35, 36 and 37 and a coolant outlet 38, 39, 40 and 41 respectively in the shells thereof to introduce coolant therein and discharge it therefrom. The cooling system comprises an inlet manifold 42, a heat exchanger or radiator 43, a discharge manifold 44, a coolant reservoir 45 and a pump 46. Coolant is supplied to inlet manifold 42 from reservoir 45 by means of pump 46 and is supplied to the coolant jackets of tubes 15–18 through insulating conduits 47–50 respectively, and discharged from the coolant jackets of tubes 15–18 through insulating conduits 51–54 to discharge manifold 44. The insulating conduits may be rubber hose reinforced with woven fabric, plastic pipe or of other suitable material. From manifold 44 coolant flows to radiator 43 and hence through pipe 55 back to reservoir 45. The cooling system in practice will also include temperature-sensing means, coolant by-pass means and pressure-regulating means to control flow of coolant through the system.

It will be noted that point 27 is always positive with respect to ground, which is positive with respect to point 28. Inasmuch as the metal shells which comprise the rectifier tube envelopes and the coolant jackets are at cathode potential, the tubes must be insulated from ground. Moreover, it may be seen that by virtue of the electrical connections that the shells of tubes 16 and 17 will always be positive with respect to ground, while the shells of tubes 15 and 18 will be alternately positive and negative with respect to ground, dependent on the half cycle of alternating current potential applied to terminals 29 and 30. For example, when the positive half cycle of an alternating current wave is applied to terminal 29, it will be seen that the shell of tube 15 is positive, but tube 15 is nonconducting, tube 16 is conducting and the shell thereof is positive with respect to ground, tube 17 is nonconducting, but by virtue of the common connection between cathode terminals 24 and 25, the shell of tube 17 is positive with respect to ground. Tube 18 will be conductive and negative with respect to ground by virtue of its cathode terminal 26 being connected to terminal 30. On the next half cycle of the alternating current wave, terminal 30 will become positive with respect to ground and tubes 15 and 17 will become conductive. The shells of tubes 16 and 17 will remain positive with respect to ground. However, the shell of tube 18 now becomes positive with respect to ground and the shell of tube 15 becomes negative with respect to ground by virtue of its connection of its cathode terminal 23 to terminal 29.

In the rectifier installation illustrated, the rectifier tubes operate at a positive voltage with respect to ground and the components of the coolant supply, the reservoir 45, pump 46, radiator 43, and manifolds 42 and 44 are at ground potential. Although the tubes are electrically insulated from ground, a D.C. leakage current flows through the coolant to ground in the insulating conduits 47–54, and returns to the tube having the negative shell. If it is assumed that terminal 29 is positive, then the shells of tubes 15, 16 and 17 will be positive with respect to ground, and leakage current will flow from the shells of tubes 15, 16 and 17 through the insulating hoses 47, 51; 48, 52; and 49, 53 connected respectively thereto. The magnitude of this leakage current is determined by the impressed voltage, the diameter and length of the insulating hoses, and the resistivity of the coolant. Recalling that the shells of tubes 15, 16 and 17 are positive with respect to ground, while the shell of tube 18 is negative with respect to ground, some of the leakage current will flow in the coolant in conduits 47–49 and 51–53 to manifolds 42 and 44 which are at ground potential and then in the coolant in conduits 50 and 54 to the shell of tube 18, dependent on the operating voltage and the resistance of the coolant in the hoses 50 and 54, and then to terminal 30 through cathode terminal 26. However, other leakage current will flow to ground through the manifolds 42 and 44 and through the ground protection relay coil 33 to point 33a, hence to point 28, which is negative with respect to ground, and then through tube 18 to terminal 30. This leakage current through the ground relay coil 33 will detrimentally affect the sensitivity of ground relay 33, particularly when it is understood that a system such as the one described, which operates between plus and minus 1000 volts peak A.C. may have a ground protection relay set to trip upon sensing current of one quarter of an ampere. Therefore, it may be seen that leakage current through the ground protective relay is a very serious consideration.

In accordance with the present invention, a rectifier cooling system is provided which eliminates flow of leakage current through the ground protective relay and which further minimizes the number of insulated hoses required, and therefore the number of electrolytic targets, as hereinafter explained.

Figure 3:
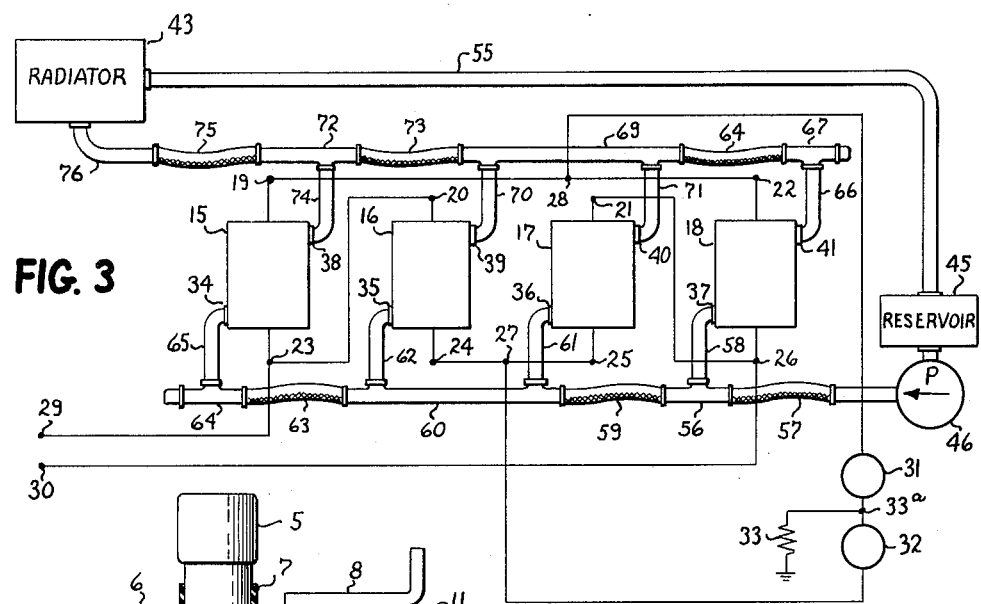
FIGURE 3 illustrates a full-wave bridge rectifier cooling arrangement embodying the invention.

Reference is now made to FIG. 3, which illustrates a rectifier cooling arrangement embodying the present invention. In FIG. 3, the rectifiers, electrical terminals and connections and the radiator, reservoir and pump bear the same identifying numerals as the corresponding elements in FIG. 2. In FIG. 3 it will be noted that the pump 46, which is at ground potential, is connected to coolant inlet manifold 56 by means of an insulating conduit 57. Manifold 56 is connected to the coolant inlet 37 of tube 18 by means of coolant conduit 58, which may be either of electrical conductive material such as copper, or a flexible conductor. In practice, it is preferred to use a short length rubber hose reinforced with steel braid that may be detached from the inlet 37 to allow removal of tube 18. It is important to note that it is not necessary that the coupling between the manifold 56 and inlet 37 be of insulating material. Another insulating conduit 59 serially connects manifold 56 to manifold 60, and preferably flexible conduits 61 and 62 connect manifold 60 to the coolant inlets 36 and 35 of the shells of tubes 17 and 16 respectively to provide coolant flow thereto. Another insulating hose 63 connects manifold 60 to manifold 64, which in turn is connected to the coolant inlet 34 of the shell of tube 15 through a flexible coolant conduit 65. The coolant discharged from outlet 41 of the shell of tube 18 is conducted by preferably flexible coolant conductor 66 to discharge manifold 67 and insulated hose 68, and hence to discharge manifold 69 to which are connected by conduits 70 and 71 the discharge outlets 39 and 40 of tubes 16 and 17 respectively. Manifold 69 is connected to manifold 72 by insulating conduit 73, preferably flexible, and the coolant discharge outlet 38 from the shell of tube 15 is connected to manifold 72 by conduit 74. Manifold 72 is further connected to radiator 43 through insulating conduit 75 and pipe 76. For reasons hereinafter described, insulating conduits 57 and 75 are made of the same length and inside diameter, or alternatively, have the same ratio of internal cross sectional area to length. It will be noted that it is not necessary that the connections between the coolant inlets and outlets of the tube shells to the manifolds electrically insulate the tubes from the manifolds. In fact, the manifolds 56, 60, 64, 67, 69 and 72 may be electrically connected to the shells of respective tubes 18; 16, 17; and 15. However, it is important that manifolds 56, 60, 64, 67, 69 and 72 be insulated from ground so that the cathodes of the tubes are not grounded.

Assume now that an alternating current wave is applied to the terminals 29 and 30, and terminal 29 is positive with respect to ground. The cathodes of tubes 15, 16 and 17, and therefore the shells thereof, will be positive with respect to ground, while the cathode of tube 18, and therefore the shell of tube 18, will be negative with respect to ground. Inasmuch as the cathodes of tubes 16 and 17 are electrically common, there will be no tendency for leakage current to flow therebetween through manifolds 60 or 69. Leakage current originating at the shells of tubes 16 and 17, due to the positive potential thereof, will flow therefrom to manifolds 56 and 67 through the coolant in insulating hoses 58 and 66 respectively, to the shell of tube 18 and hence to cathode terminal 26 and terminal 30. Leakage current, due to the positive potential of the shell of tube 15 with respect to ground, will flow from manifold 72 into the coolant in insulating conduit 75 through the coolant in the system comprising radiator 43, pipe 55, reservoir 45 and pump 46, which are at ground potential, and then through the coolant and insulating hose 57 to manifold 56 and the shell of tube 18, and hence to cathode terminal 26 and terminal 30. It will be seen that the coolant discharged from the shell of tube 15 is above ground potential due to contact with the envelope of tube 15, and flows into the radiator and reservoir and pump, which are at ground potential, and then through insulating hose 57 to manifold 56, which is at a potential below ground potential.

The leakage current therefore, in following the leakage current path provided, does not flow through the ground protective relay coil 33, and therefore does not detrimentally affect the sensitivity of the relay. On the next half cycle of the applied A.C. wave, the shell of tube 18 is positive with respect to ground, the shell of tube 15 is negative with respect to ground, and the leakage current paths are the reverse of that previously explained.

As previously stated, the hoses 57 and 75 are selected to have the same ratio of cross sectional area to length so that the coolant therein presents the same resistance to flow of leakage current therethrough. This is an important feature of the invention. Assume, for example, that the applied alternating current wave has positive and negative peak values of 1000 volts. Therefore, it may be assumed that the potential at the shell of tube 15 is plus 1000 volts when terminal 29 is positive, and the potential at the shell of tube 18 is minus 1000 volts with respect to ground. Therefore, the leakage current flow to ground through the coolant in hose 75 will be equal to the current flowing to the shell of tube 18 from ground through hose 57 during the first half cycle, and in the next half cycle the current flowing from the shell of tube 18 through the coolant in hose 57 will be equal to the current flowing to the shell of tube 15 from ground through hose 75. By insuring that the leakage current flowing from ground to the shell of tube 18 is supplied by the leakage current from the shell of tube 15 to ground, and vice versa on alternate half cycles, and that the resistance in each of these leakage paths is in the same, there is no unbalance in these leakage currents to and from ground, and therefore no leakage current will flow through ground protective relay coil 33. Therefore, the coolant in the grounded components of the cooling system is always midway between the positive and negative leakage currents, and no leakage current which would detract from the sensitivity of ground relay coil 33 is circulated due to leakage current in the coolant. It will be noted in the arrangement of FIG. 3 that the inlet and outlet manifolds 56, 60, 64, 67, 69 and 72 are electrically insulated from ground by insulating conduits 57 and 75, whereas the inlet and discharge manifolds 42 and 44 of FIG. 2 are at ground potential. In FIG. 2, inasmuch as the tubes 15 through 18 must be electrically insulated from ground, it is necessary that each tube be individually connected between the inlet and discharge manifolds by insulating hoses. Where each leg of the rectifying system contains several rectifying tubes in parallel, which in practice is quite common, it will be seen that a large number of insulating conduits are required, and also each insulating conduit will require the provision of two electrolytic targets. As is well known to those skilled in the art, an electrolytic target is provided to carry the major portion of an electrolytic current where the current transfers from metallic piping to fluid in an insulated conduit to avoid electrolytic deterioration of the metallic piping. In the system of FIG. 3, it will be seen that regardless of the number of rectifying tubes that are provided per rectifier leg, only six insulating conduits are required, and therefore only twelve electrolytic targets; while in a system such as illustrated in FIG. 2 the number of electrolytic targets will be equal to twice the number of tubes in the rectifying system. Moreover, in the system of FIG. 2, the insulating conduits 47–54 must be chosen sufficiently long to cause the coolant therein to present sufficient resistance to flow of leakage current therethrough to reduce the ground leakage current to an allowable value.

By way of illustration only, a locomotive rectifier system having three tubes per leg and using the cooling arrangement of FIG. 2, required 24 insulating conduits of 12-foot length and ¾-inch diameter, while an identical locomotive rectifier system using tubes of the same power rating and supplying the same rated load, using the cooling system of FIG. 3 in accordance with the invention, required two 10-foot lengths, 2-inch diameter insulating hoses corresponding to conduits 57 and 75 of FIG. 3, and three 8-foot length, 2-inch diameter and one 12-foot, 2-inch diameter hoses corresponding to hoses 59, 63, 64 and 73 of FIG. 3. The 12-foot hose was required rather than an 8-foot hose because of the physical placement of the manifolds it was connecting. The number of electrolytic targets was reduced from 48 to 12.

In FIG. 3, it will be apparent that insulating conduit 75 could be connected to the radiator 43 from the righthand end of discharge manifold 67; however, to achieve hydraulic balance across the various tubes, it is preferred to make this connection as shown.

Besides eliminating undesirable ground leakage currents, the invention provides further advantages. It reduces the number of long insulating conduits, particularly where several tubes may be paralleled in each rectifier leg and therefore reduces the size of the pump 46 required, inasmuch as coolant pressure requirements are reduced. Moreover, since there are only two coolant leakage paths to ground in locomotive applications, high potential testing of locomotive insulation may be performed without draining water from the locomotive.

The invention is also applicable to a three-phase—full-wave rectifying system of the type using six tubes, or six banks of parallel tubes, wherein three tubes or tube banks have common cathode connections to a positive direct current terminal, and the other three tubes or tube banks have common anode connections to a negative direct current potential. In this well known arrangement, the cathode terminal of each tube or tube bank having the common anode connection is connected to the anode terminal of a tube or tube bank having the common cathode connection, which connections provide alternating current input terminals.

In such an arrangement, it is apparent that the cathodes of the tubes having the common cathode connection are always positive with respect to ground, while the cathodes of the tubes having the common anode connection are at potentials determined by the 120 degree phase difference between the three-phase input.

To apply the present invention to a three-phase—full-wave rectifying system, the tubes or tube banks having the common cathode connection would be connected between an inlet and a discharge manifold, as tubes 16 and 17 of FIG. 3. Each of the tubes or tube banks having the common anode connection would be connected between associated inlet and discharge manifolds, as tubes 15 and 18 of FIG. 3. An insulating conduit of predetermined length to area would connect the coolant source to the inlet manifold of a first of the tubes or tube banks having the common anode connection, and the inlet and discharge manifolds of this tube would be connected by insulating conduits to the inlet and discharge manifolds of the tubes or tube banks having the common cathode connection. The inlet and discharge manifolds of the tubes having the common cathode connection would then be connected to the inlet and discharge manifolds of a second of the tubes or tube banks having the common anode connection. The inlet manifold of the second of the tubes or tube banks having the common anode connection would be connected to the inlet manifold of the third tube or tube bank having the common anode connection, and the discharge manifolds of the second and third tubes or tube banks having the common anode connection would be individually connected each by a discharge insulating conduit to a return path to the coolant source. The discharge insulating conduits from the discharge manifolds of the second and third tubes or tube banks having the common anode connection would be so chosen in length to cross sectional area ratios that the parallel resistance value of the coolant therein would be equal to the resistance value of the coolant in the inlet insulating conduit to the inlet manifold of the first tube having the common anode connection. Also, the discharge conduits must be chosen to have equal length to cross-sectional area ratios for proper addition of the leakage currents therethrough.

Consideration of this cooling arrangement shows that the resistance to leakage current from the grounded portion of the coolant system, namely, the radiator, reservoir, and pump, through the coolant in the inlet insulating conduit to the first inlet manifold is the same as the parallel resistance to leakage current through the coolant in the discharge insulating conduits from the discharge manifolds of the second and third tubes or tube banks having the common anode connection, and therefore, the leakage current to ground from the tubes through the coolant would be equal to the leakage current from ground to the tubes through the coolant, resulting in a balance of leakage currents, and therefore no circulation of leakage currents. Consideration of well known alternating current theory will show that the leakage current from any two of the tubes or tube banks having the common anode connection is vectorially equal but opposite to leakage current from the other tube having the common anode connection. Therefore, by so selecting the inlet insulating conduit and the discharge insulating conduits in a three-phase system as described, the inlet coolant path from ground and the discharge coolant path to ground may be made equal in resistance value and the leakage current through the coolant in the inlet insulating conduit and the leakage currents through the coolant in the discharge insulating conduits to ground will be balanced.

While the invention has been described and illustrated in one form thereof selected for purposes of disclosure, other embodiments and modifications of the disclosed invention may occur to those skilled in the art which do not depart from the spirit and scope of the invention. Accordingly, it is intended to cover all modifications of the invention and changes in the disclosed embodiment thereof which do not constitute departure from the spirit and scope of the invention.

What is claimed as new and is desired to secure by Letters Patent of the United States is:

1. A cooling arrangement for a full-wave alternating-to-direct current rectifier system utilizing a liquid cathode, metal envelope rectifier tubes wherein the envelopes of said tubes assume the potential of the contained liquid cathode, one half of said tubes having a common cathode connection to a positive direct current terminal, the other half of said tubes having a common anode connection to a negative direct current terminal, the cathode of each of said tubes having a common anode connection being connected to the anode of one of said tubes having a common cathode connection, said cathode-anode connections providing alternating current input terminals whereby the potential of the cathodes of the tubes having common anode connections vary with the applied alternating current, said tubes having a coolant-retaining means about said tube envelopes with coolant inlet and outlet means therein, said cooling arrangement comprising:

(a) inlet insulating conduit means and discharge insulating conduit means, said inlet and discharge conduit means having length and cross-sectional area ratios so chosen that coolant therein has the same resistance value;

(b) inlet manifold means comprising an inlet manifold for said tubes having a common cathode connection and an inlet manifold for each of the other tubes, insulating conduit means connecting said inlet manifolds, discharge manifold means comprising a discharge manifold for said tubes having a common cathode connection and a discharge manifold for each of the other tubes, insulating conduit means connecting said discharge manifolds, said inlet and discharge manifolds of said tubes having a common cathode connection being intermediate inlet and discharge manifolds of the other tubes;

(c) conduit means connecting the inlets and outlets of the coolant-retaining means of each tube between its associated inlet and discharge manifolds whereby each of said tubes is hydraulically in parallel between said inlet and discharge manifold means;

(d) said inlet insulating conduit means connecting a source of coolant at ground potential and to one of the inlet manifolds of one of the tubes having a common anode connection at one end of said inlet manifold means;

(e) said discharge insulating conduit means connecting the discharge manifold means to the source of coolant from the discharge manifold of the other of said tubes having a common anode connection.

2. A cooling arrangement for a full-wave alternating-to-direct current rectifier system utilizing a liquid cathode, metal envelopes rectifier tubes arranged in banks of parallel tubes wherein the envelopes of said tubes assume the potential of the contained liquid cathode, the tubes of one half of said banks having common cathode connections to a positive direct current terminal, the other half of side banks of tubes having common anode connections to a negative direct current terminal, the cathodes of each of said banks of tubes having common anode connections being connected to the anodes of one of said banks of tubes having common cathode connections, said cathode-anode connections providing alternating current input terminals whereby the potential of the cathodes of the tubes having common anode connections vary with the applied alternating current, said tubes having a coolant-retaining means about said tube envelopes with coolant inlet and outlet means therein, said cooling arrangement comprising:

(a) inlet insulating conduit means and discharge insulating conduit means, said inlet and discharge conduit means having length and cross-sectional area ratios so chosen that coolant therein has the same resistance value;

(b) inlet manifold means comprising an inlet manifold for said bank of tubes having a common cathode connection and an inlet manifold for each of the other banks of tubes, insulating conduit means connecting said inlet manifolds, discharge manifold means comprising a discharge manifold for said banks of tubes having common cathode connections and a discharge manifold for each of the other banks of tubes, insulating conduit means connecting said discharge manifolds, said inlet and discharge manifolds of said banks of tubes having a common cathode connection being intermediate inlet and discharge manifolds of the other banks of tubes;

(c) conduit means connecting the inlets and outlets of the coolant-retaining means of each tube between its associated inlet and discharge manifolds whereby each of said tubes is hydraulically in parallel between said inlet and discharge manifold means;

(d) said inlet insulating conduit means connecting a source of coolant at ground potential and to one of the inlet manifolds of one of the banks of tubes having common anode connections at one end of said inlet manifold means;

(e) said discharge insulating conduit means connecting the discharge manifold means to the source of coolant from the discharge manifold of the other of said banks of tubes having common anode connections.

3. A cooling arrangement for a three-phase—full-wave alternating-to-direct current rectifier system utilizing six banks of electrically parallel liquid cathode, metal envelope rectifier tubes wherein the envelopes of said tubes assume the potential of the contained liquid cathode, three banks of said tubes having a common cathode connection to a positive direct current terminal, the other three banks of said tubes having a common anode connection to a negative direct current terminal, the cathodes of each of said tube banks having a common anode connection being connected to the anodes of one of said tube banks having a common cathode connection, said anode-cathode connections providing alternating current input terminals, said tubes having a coolant-retaining means about said tube envelopes with coolant inlet and outlet means therein, said cooling arrangement comprising:

(a) first coolant inlet and outlet manifolds;

(b) coolant conduit means connecting the coolant inlets and outlets of the tubes of said tube banks having a common cathode connection respectively between said first inlet and outlet manifolds;

(c) coolant inlet and outlet manifolds for each of said other tube banks and coolant conduit means connecting each tube of the other tube banks respectively between associated inlet and outlet manifolds;

(d) means providing a source of coolant, and inlet insulating conduit means of predetermined length to cross-sectional area ratio connecting said means providing a source of coolant to the inlet manifold of one of said tube banks having a common anode connection;

(e) insulating conduit means connecting said inlet and outlet manifolds of said one of said tube banks having a common anode connection to the inlet and outlet manifolds respectively of said tube banks having a common cathode connection;

(f) further insulating conduit means serially connecting the inlet manifolds of the second and third of said tube banks having a common anode connection to the inlet manifold of the tubes having a common cathode connection, there being insulating conduit means between the inlet manifolds of said second and third tubes, and insulating conduit connecting the discharge manifold of said tube banks having a common cathode connection and the discharge manifold of said second tube bank; and (g) discharge insulating conduits for connecting the outlet manifolds of the remaining tubes to said means providing a source of coolant, said discharge insulating conduits and said inlet insulating conduit means having equal length to cross-sectional area ratios such that the parallel resistance value of coolant in said discharge insulating conduits is equal to the resistance value of coolant in said inlet insulating conduit means.

4. The cooling arrangement of claim 3 wherein each tube bank comprises one tube.

5. In combination with a plurality of liquid cathode metal envelope rectifier tubes in a four-legged bridge arrangement adapted to full-wave rectify single phase alternating current and supply direct current to a non-grounded load having a ground current sensing device in circuit therewith, the cathodes of the rectifiers in two of the legs being electrically commonly connected to the positive terminal of the direct current circuit, the anodes of the tubes of the other two legs being commonly connected to the negative terminal of the direct current circuit, the cathodes of the tubes of each of the other legs being connected to the anodes of the tubes on the first two legs, the anode-cathode connections providing alternating current input terminals, a coolant jacket defining a coolant inlet and a coolant outlet therein about each of the envelopes: a cooling arrangement comprising, (a) means providing a source of coolant;

(b) a first insulating conduit of predetermined length connecting the coolant source to a first inlet manifold;

(c) a second insulating conduit connecting said first inlet manifold to a second inlet manifold;

(d) a third insulating conduit connecting said second inlet manifold to a third inlet manifold;

(e) first inlet conduit means connecting said first inlet manifold to the coolant inlet of the tubes of one of said legs having a common anode connection;

(f) a first discharge manifold, first discharge conduit means connecting the coolant outlet of the tubes of said one of said legs to a first discharge manifold;

(g) second inlet conduit means connecting said second inlet manifold to the coolant inlets of said tubes having a common cathode connection;

(h) a second discharge manifold, second discharge conduit means connecting the coolant outlets of said tubes having a common cathode connection to said second discharge manifold;

(i) a fourth insulating conduit means connecting said first and second discharge manifolds;

(j) third inlet conduit means connecting said third inlet manifold to the coolant inlet of the other of said legs having a common anode connection;

(k) fifth insulating conduit means connecting said second and third discharge manifolds;

(l) a third discharge manifold, third discharge conduit means connecting the coolant outlets of the tubes of the other of said legs having a common anode connection to said third discharge manifold; and (m) a sixth insulating conduit means having a length to cross-sectional area ratio equal to the length to cross-sectional area ratio of said first insulating conduit connecting one of said first or third discharge manifold to a coolant return path to said reservoir.

6. In a cooling arrangement for a full-wave rectifier system of the type wherein cooling fluid passages at a first potential in each of the rectifier devices of the system are connected through an inlet and a discharge manifold to a cooling fluid source at a second potential for the circulation of cooling fluid therein, the combination of means for neutralizing leakage currents through said cooling fluid to the point of said second potential, said means comprising first and second insulating conduits connecting said inlet and discharge manifolds respectively to said cooling fluid source and providing electrical isolation between said manifolds and the potential of said fluid source, said first and second insulating conduits having equal ratios of length to cross sectional area so that the coolant therein has the same resistance value.

7. A cooling arrangement for a full-wave rectifier system of the type employing a plurality of rectifier devices each having a cooling fluid conducting passage wherein the cooling fluid is in electrical contact with said rectifier device, the combination comprising: a source of cooling fluid at a first potential; an inlet manifold and a discharge manifold at a second potential; means for connecting the fluid conducting passages of each of said rectifier devices to said inlet and discharge manifolds to provide for fluid flow therein; means associated with said inlet and discharge manifolds for maintaining electrical isolation between said rectifier devices; and means including first and second insulating conduits connecting said inlet and discharge manifolds respectively to said source of cooling fluid to provide for the circulation of cooling fluid through the fluid conducting passages of said rectifier devices, and electrical isolation between said manifolds and the potential of the source of cooling fluid, said first and second insulating conduits having the same ratio of length to cross sectional area so that the portion of the cooling fluid at said first potential is maintained midway between the two rectified direct current points to neutralize leakage current in said cooling fluid.

8. A cooling arrangement for a full-wave rectifier system of the type employing a plurality of rectifier devices each having a cooling fluid conducting passage wherein the cooling fluid is in electrical contact with said rectifier device, the combination comprising: a source of cooling fluid including a supply and a discharge conduit at a first potential; an inlet manifold and a discharge manifold at a second potential; means for connecting the fluid conducting passages of each of said rectifier devices to said inlet and discharge manifolds to provide for fluid flow therein; means associated with said inlet and discharge manifolds for maintaining electrical isolation between said rectifier devices; and means including first and second insulating conduits connecting said inlet and discharge manifolds respectively to said supply and discharge conduits of said source of cooling fluid to provide for the circulation of cooling fluid through the fluid conducting passages of said rectifier devices and electrical isolation between said manifolds and the potential of the source of cooling fluid, said first and second insulating conduits having the same ratio of length to cross sectional area so that the portion of the cooling fluid at said first potential is maintained midway between the two rectified direct current points to neutralize leakage current in said cooling fluid.

References Cited by the Examiner

UNITED STATES PATENTS

| 2,254,692 | 9/1941 | Ehlert | 315—113 |
| 2,256,757 | 9/1941 | Durand | 315—113 |

GEORGE N. WESTBY, *Primary Examiner.*

C. R. CAMPBELL, *Assistant Examiner.*